United States Patent [19]

Kafka et al.

[11] 4,270,478
[45] Jun. 2, 1981

[54] DISAPPEARING CLEAT OR FITTING

[75] Inventors: Charles F. Kafka, Bradenton; Robert S. Kafka, Maitland, both of Fla.

[73] Assignee: Meacham Marine Products, Inc., Sarasota, Fla.

[21] Appl. No.: 24,790

[22] Filed: Mar. 28, 1979

[51] Int. Cl.³ ............................................ B63B 21/04
[52] U.S. Cl. .................................................. 114/218
[58] Field of Search ....................... 114/218, 177, 211; 410/101, 102, 107, 109, 111, 112, 116; 248/500, 499, 503

[56] References Cited

U.S. PATENT DOCUMENTS

| | | | |
|---|---|---|---|
| 1,402,496 | 1/1922 | Hoffman | 114/218 |
| 2,555,805 | 6/1951 | Miller | 114/218 |
| 2,870,733 | 1/1959 | Winther | 114/218 |
| 3,093,106 | 6/1963 | Lippincott | 114/218 |
| 3,298,652 | 1/1967 | Burdick | 410/107 |

*Primary Examiner*—Trygve M. Blix
*Assistant Examiner*—Jesus D. Sotelo
*Attorney, Agent, or Firm*—Julian C. Renfro

[57] ABSTRACT

A rotatable device for marine use is provided, comprising a housing designed to be embedded in the deck of the boat, with such housing having therein an opening in which is rotatably mounted a cleat member. The rotatable cleat member comprises a plate substantially flat on one side, and having affixed on its other side an upstanding cleat or other such fitting. The rotatable cleat member is supported by a pair of parallel shafts, with one extending outwardly from each side or end thereof, and each of the oppositely extending shafts being received in a respective elongate, vertical slot in the wall of the housing. At least one of the shafts is configured so as to be non-rotatable in a portion of its respective slot. A bias is provided for biasing the rotatable cleat member upwardly, with such bias being able to be overcome by finger pressure such that the cleat member can on occasion be moved downwardly in its housing. Such downward movement causes the shafts to be moved downwardly in their respective slots, which slots are enlarged at their bottom locations to permit the cleat member to then be rotated 180°, such that either the cleat or the flat plate may be selected to reside flush with the upper surface of the deck.

19 Claims, 21 Drawing Figures

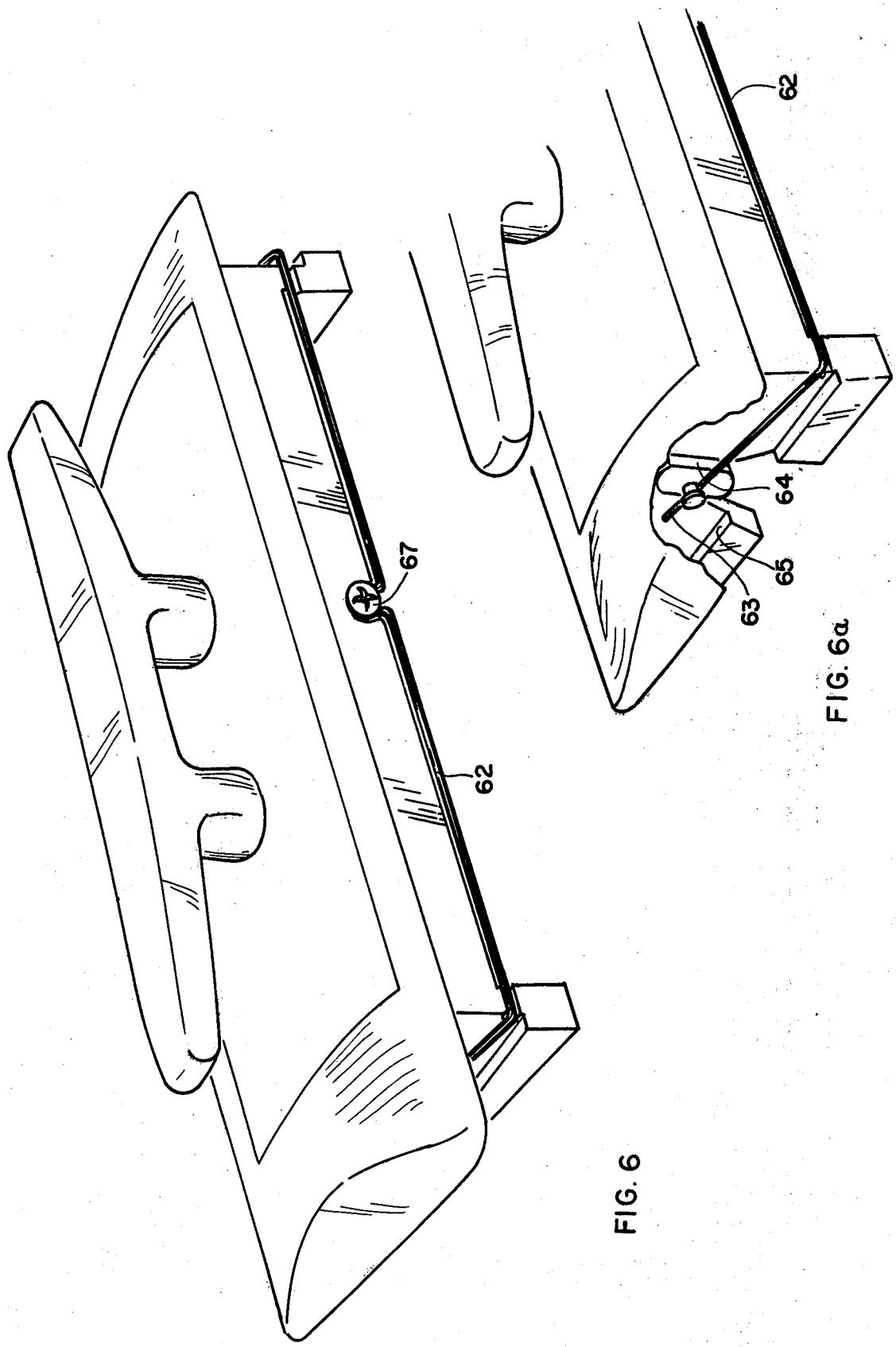

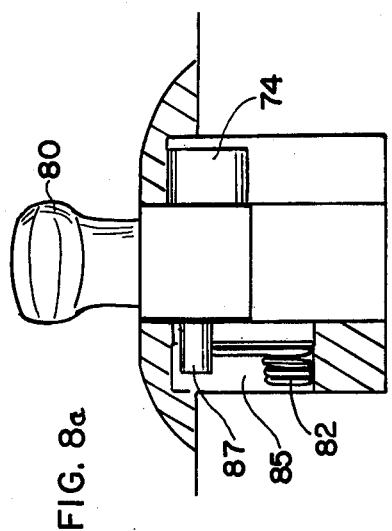
FIG. 8a
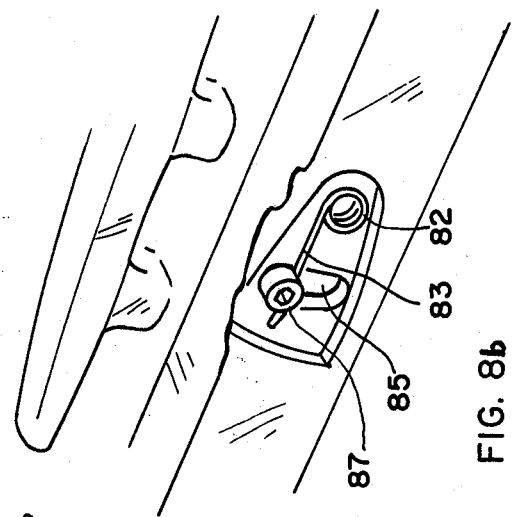
FIG. 8b
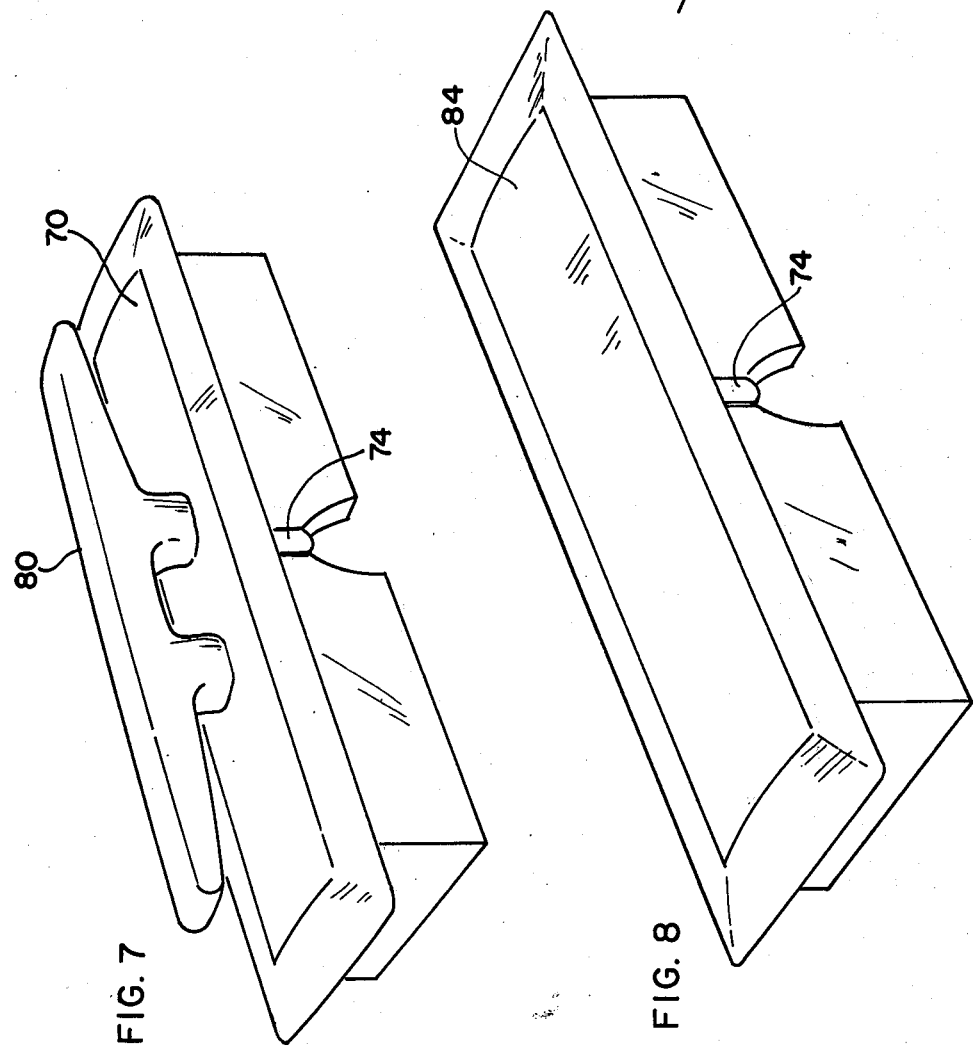
FIG. 7
FIG. 8

DISAPPEARING CLEAT OR FITTING

BACKGROUND OF THE INVENTION

In the past, a number of patentees have been concerned with the fact that upstanding fixed cleats on the deck of a vessel, provided for the fastening of ropes, lines, fenders and the like, present a very real hazard in that persons walking on the deck may trip over same. Furthermore, items such as nets, fishing lines, and the like tend to become snagged on deck projections such as cleats from time to time. On the other hand, a cleat must be of strong construction and firmly fixed to the deck of the boat in order that it will be able to serve a useful and dependable function, such as is involved in the mooring and towing of boats.

The Hoffman U.S. Pat. No. 1,402,496 specifically designed for submarines to reduce underwater drag and remove a projection that could catch nets, seaweed, etc. taught a disappearing cleat that would move out of sight when not in use, and that device involved a folding arrangement such that the cleat could move 90 degrees between inactive and active positions, leaving an open well which housed the cleat. However, while that cleat could withstand a pull in some directions, it could not withstand a pull in other directions, and in addition, it was expensive as well as cumbersome to use, and in lighter vessels would tend to vibrate.

The Miller U.S. Pat. No. 2,555,805 entitled "Collapsible Cleat" involved a pair of pivoted members that could be individually lifted out of the plane of the deck to meet in a vertical position when use of a cleat was desired, but then at other times these members could return to a flattened position. Unfortunately, this type of cleat could not withstand a hard pull depending as it did on the strength of the pivot point, and in addition, was difficult to move to an active position.

The Lippincott U.S. Pat. No. 3,093,906 entitled "Flush Mounted Cleat" could be moved directly upwardly from a retracted position, but it could not be used with large diameter lines or ropes not only because of its insubstantial construction, but also because of the fact that by its nature, the cleat body could not be moved very far above the deck away from its retracted position. It was to overcome the weaknessess and other disadvantages as well as the expense of these prior art devices that the present invention was created.

SUMMARY OF THE INVENTION

Our basic cleat is constructed on the premise that a cleat is surplusage on the deck of a boat underway until such time as the boat is to be moored, or other such infrequent use is to be made of the cleat, and to that end our several cleat embodiments are constructed such that a smooth, unencumbered deck is presented until such time as a mooring or other operation is to be carried out.

The basic cleat is disposed in a mounting frame, in which frame the cleat is easily rotatable 360° in either direction. Although electric, pneumatic or other means could be used to power the cleat, in the preferred embodiments the cleat is arranged to be readily moved by finger pressure between a position in which the cleat is in an upstanding, operative position, and a position in which the cleat is replaced by an attractive plate contributing to the deck of the boat having clean, uncluttered lines, and leaving passageways free of dangerous projections.

One embodiment of our invention involves a cleat member rotatable about its longitudinal axis in its generally rectangular, oval or irregularly-shaped frame, with the frame or housing being equipped with an aperture of sufficient dimension that the cleat can easily clear the frame when moved downwardly and then rotated between its active and its inactive positions. This embodiment is particularly adapted for use in locations where the amount of space below the cleat frame is limited.

Another embodiment of our invention involves a cleat member rotatable about its lateral axis, which of course enables the cleat frame to have a narrower rotation-permitting aperture but which requires more clearance below the cleat frame in order that 360° cleat rotation can be accomplished.

In either embodiment, the cleat member is equipped with short supporting shafts about which cleat rotation can take place. At least one of these short shafts is of non-circular cross section, with the narrow dimension of the shaft being received in a respective narrow, vertically disposed slot located in a wall of the cleat housing.

In both the longitudinally and laterally rotatable embodiments, spring bias means are active in order to place the cleat in a usable, active position in the one instance, and the attractive closure plate in a desirable relationship to the deck of the boat in the other instance.

The bias is preferably such as to be able to be overcome by finger pressure, such that the cleat member can be initially moved downwardly in its housing, after which 180° of rotation in either direction can be caused to take place. Thus, the narrow, vertically disposed slots prevent initial rotation such as might cause contact with the cleat frame, but after the cleat has been moved for a sufficient distance downwardly, enlargements at the bottom of the slots afford sufficient shaft freedom as to permit the cleat member to be readily rotated into the desired condition.

In order to enhance the strength of the structure, a "shoulder" or "rabbet" runs the length or breadth on the edges of the rotatable cleat plate, which are designed to meet the underside of the inner edge of the frame structure so that when a sidewise or upward pull is applied, the force is actually applied directly to the cleat housing or frame. Our device is of greater strength in its deck attachment than an ordinary cleat and is not dependent on the strength of its pivot points. Thus, despite its ability to be rotated by finger pressure, our novel cleat member is nevertheless quite sturdy in its construction, and no unusual material or fabrication techniques are involved in the construction of our device.

It is therefore a principal object of our invention to provide a novel cleat member rotatable for 360° by finger pressure, thus to enable a boater to select either the cleat to be in an operative position, or else cause a boat so equipped to have a deck uncluttered by a cleat member.

It is another object of our invention to provide a cleat member of economical construction rotatable in the deck of a vessel for 360° degrees such that the user can quickly and easily select either the cleat, or an attractive flat plate to be present upon the deck of the vessel in a given instance.

It is another object of our invention to provide a cleat member freely rotatable between inoperative and operative positions in the deck of a vessel, with supporting shafts equipped with flattened sides being mounted in narrow slots such that rotation of the cleat can be accomplished only at such time as it has been initially moved downwardly such that supporting shafts enter enlarged slot locations.

Other marine fittings, such as chocks, bowlights, handholds, tiedowns or the like can become easily rotatable to out of the way locations in accordance with this concept.

These and other objects, features, and advantages will become more apparent from a study of the appended drawings.

BRIEF DESCRIPTION OF THE DRAWINGS

FIG. 1a is a fragmentary view generally along the lines of FIG. 1 but having portions cut away to reveal internal construction, including the bias means;

FIG. 2a is a view similar to FIG. 2, but shown with a portion disposed below its supporting shaft;

FIG. 3a is an end view revealing the appearance of our novel device when the cleat is disposed below deck;

FIG. 6 is an embodiment generally along the lines of the device of FIG. 1, but differing by having a single longitudinally extending spring for biasing the cleat member upwardly;

FIG. 6a is a fragmentary view with portions broken away to reveal the manner in which each end of the single spring acts to bias a supporting shaft into its slot;

FIG. 7 is a perspective view of a laterally rotatable embodiment of a cleat in accordance with our invention;

FIG. 8 is a view of the same device as in FIG. 7 after the cleat has been rotated to the recessed position, thus to leave an attractive plate in contact with the surface of the deck.

FIG. 8a is a cross sectional end view of the cleat of FIGS. 7 and 8, revealing the hollow interior portion of the cleat housing;

FIG. 8b is a view revealing bias spring detail; and

DETAILED DESCRIPTION

Figure 1:
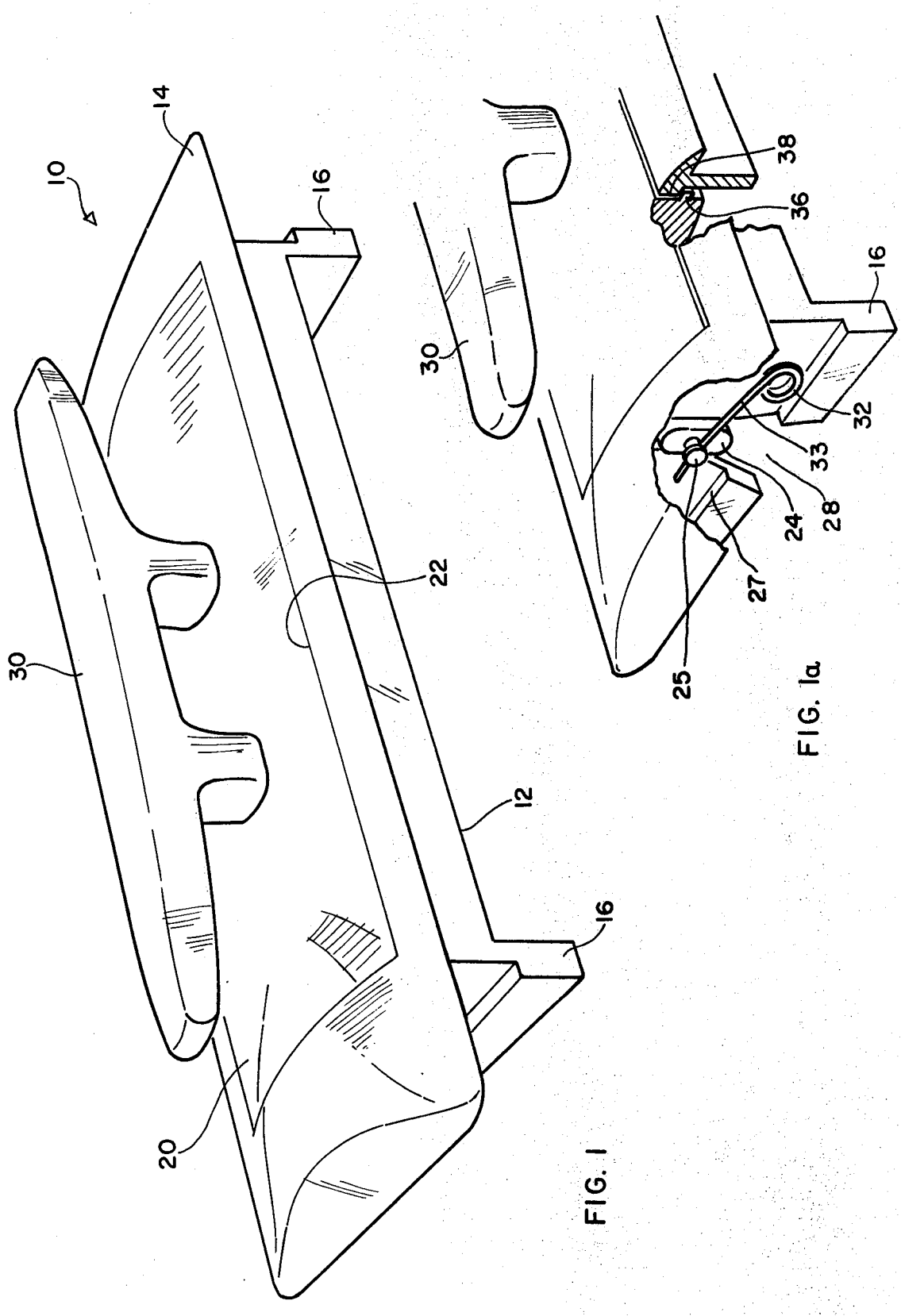
FIG. 1 is a perspective view of a first embodiment of a rotatable cleat device in accordance with our invention, this being a device rotatable about its longitudinal axis, that has been moved to its active position.

Turning to FIG. 1, it will be noted that we there illustrate a first embodiment of a rotatable cleat arrangement 10 in accordance with this invention, this involving a housing 12 that is adapted to be placed in the upper deck of a boat, ship, or other vessel. For example, the housing 12 is typically secured in a rectangular or oval hole the size of the lower housing portion, with the housing thereafter residing in such a position that the upper housing portion 14 resides flush with the deck or other surface of the boat or craft, and with the end portions 16 typically extending downwardly for an inch or two below the upper surface of the deck.

A rotatable cleat member 20 provided with a cleat 30 is designed to reside in close-fitting manner in a central rectangular, oval or irregularly shaped aperture or opening 22 in the housing or frame 12, with the cleat member being supported therein by a pair of parallel, outwardly-extending shafts 24. In the embodiment shown in FIG. 1, the cleat member 20 is rotatable about its longitudinal axis, and in FIG. 1a, a portion of the housing is broken away in order to reveal by the configuration of shaft 24 at the near end of the device that the shaft is non-circular, and that a narrow shaft portion resides in a narrow vertical slot 26 formed in the end portion 16 of the housing. Although not illustrated, it is to be understood that the shaft 24 at the other end of the device in accordance with this embodiment may be configured in a like manner, and also reside in a narrow, vertically-disposed slot.

In the preferred instance, the uppermost and lowermost portions of each shaft 24 are rounded, with the sides of each shaft being comparatively close together and vertically disposed, with this narrow shaft dimension being only slightly smaller than the width of the respective slots 26. Because of this, the cleat member 20 is non-rotatable when it is in an upper or active position as shown in FIGS. 1 and 1a, and can be rotated only after the cleat member has been pushed downwardly, such as by finger pressure to a location in which its shafts 24 are below the slots 26. Below each slot 26 is an enlarged portion 28 of a size or diameter that will accomodate the major cross-sectional dimension of each shaft 24. Springs 32 of a type visible in FIGS. 1a, 2 and 2a are utilized at each end of the device in order to normally push the shafts 24 into the upper portions of their respective slots 26, and it is only at such time as the spring bias has been temporarily overcome by finger pressure on the rotatable member 20 that the major dimension of the oblong shafts 24 can reach the enlarged portions 28 as will enable rotation of the cleat member to take place.

As will thus be obvious, we construct the cleat member 20 to be non-rotatable until it has moved downwardly for a comparatively substantial distance in its frame or housing, with this design being a criteria in order that the cleat 30 will not strike the aperture-defining edge of the housing during cleat member rotation.

Figure 2:
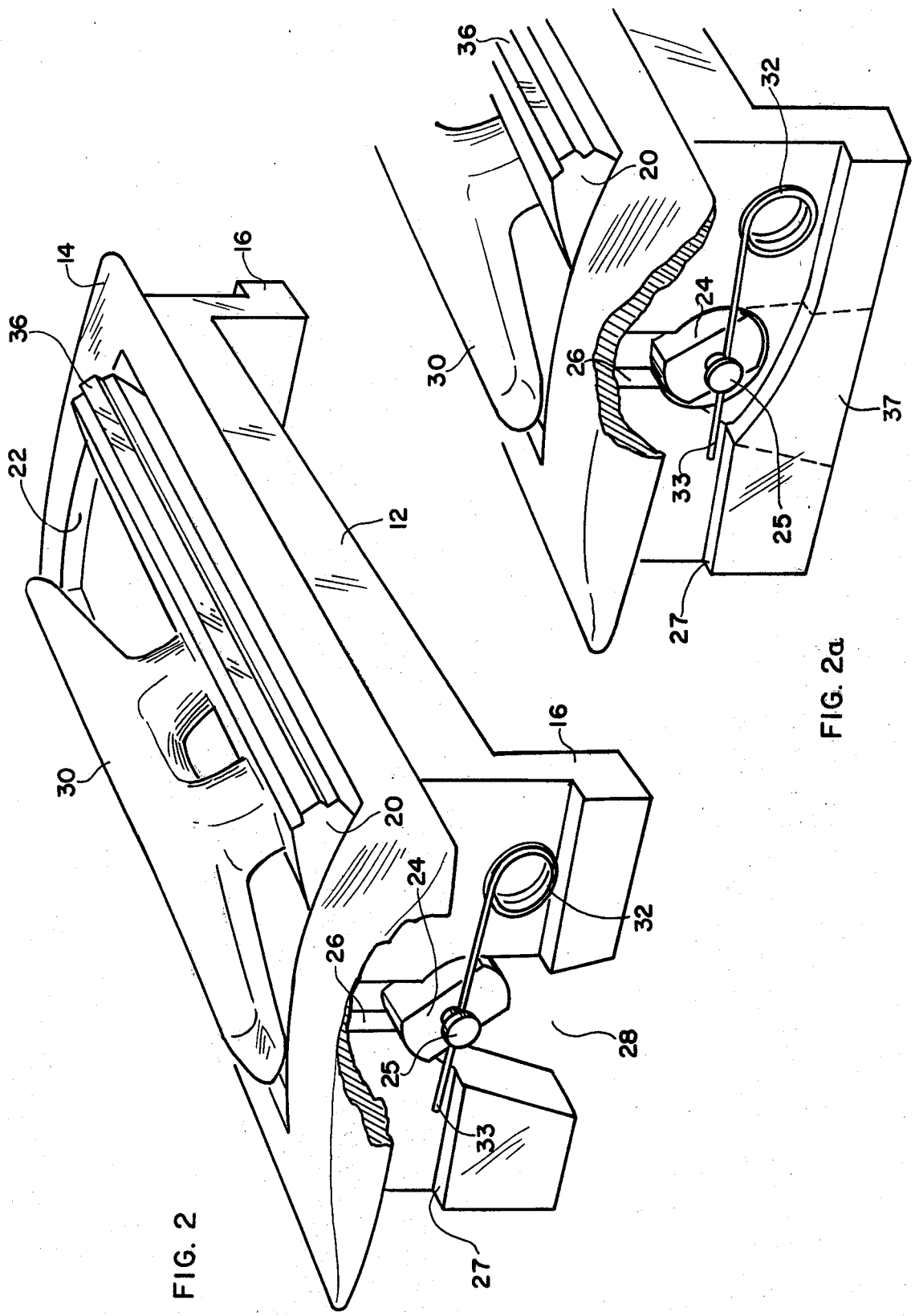
FIG. 2 is a perspective view of the embodiment of FIG. 1, in which the cleat member has been moved downwardly sufficiently far that it can be rotated away from its active position.

It will be noted in FIG. 1a, and even more clearly in FIG. 2 that a ridge or shoulder 36 is provided along each long side of the rotatable cleat member 20, which shoulder is adapted to fit in close contact with a lip or edge 38 formed along the long inner edge portion of the central opening 22 of the housing frame; see FIG. 1a. The spring bias means provided at each end of the device effectively serves to keep the rotatable cleat member in the proper relation to the deck at all times when cleat rotation is not being effected, with the shoulder 36 on each side of the member 20 being in firm contact with the edge 38 of the inner frame portion in such instances, and serving to transfer any force but one applied downwardly, directly to the frame 12. We preferably construct the shoulders 36 to contact edges 38 before the shafts 24 would reach the tops of their respective slots.

FIGS. 2 and 2a reveal the preferred use of a type of torsion spring 32 whose free end 33 is designed to contact the respective shaft 24 at a location where a constant diameter rounded portion is presented. As is obvious, one end of the spring is anchored in the end member 16, with it being understood that the free or active end 33 of the spring may be utilized on either the inboard or the outboard portion of each member 16, depending of course on the particular circumstance. However, we prefer for the free end 33 to be on the outboard end of each member 16, and we prefer to use a small extension 25 on each shaft 24 to be contacted by the spring. The head on the extension 25 prevents the spring end 33 from becoming displaced.

It is to be noted in this embodiment that the springs 32 serve to retain the rotatable cleat member in the housing 12, and in order to prevent the rotatable cleat member from moving downwardly too far, we prefer to use a shelf 27 on each outboard end of each member 16, such that too much motion of the free end 33 of each spring will be effectively prevented.

To remove the rotatable cleat member from its housing, should such ever be necessary, it is only necessary in the embodiment of FIG. 2 to move the free end 33 of each spring away from its respective shelf 27, for when this has been done, the member 20 can then be removed downwardly. In FIG. 2a, we have shown the optional use of a lower housing member 37 designed to positively prevent loss or displacement of the rotatable member from its housing except when such be necessary or desirable.

Figure 3:
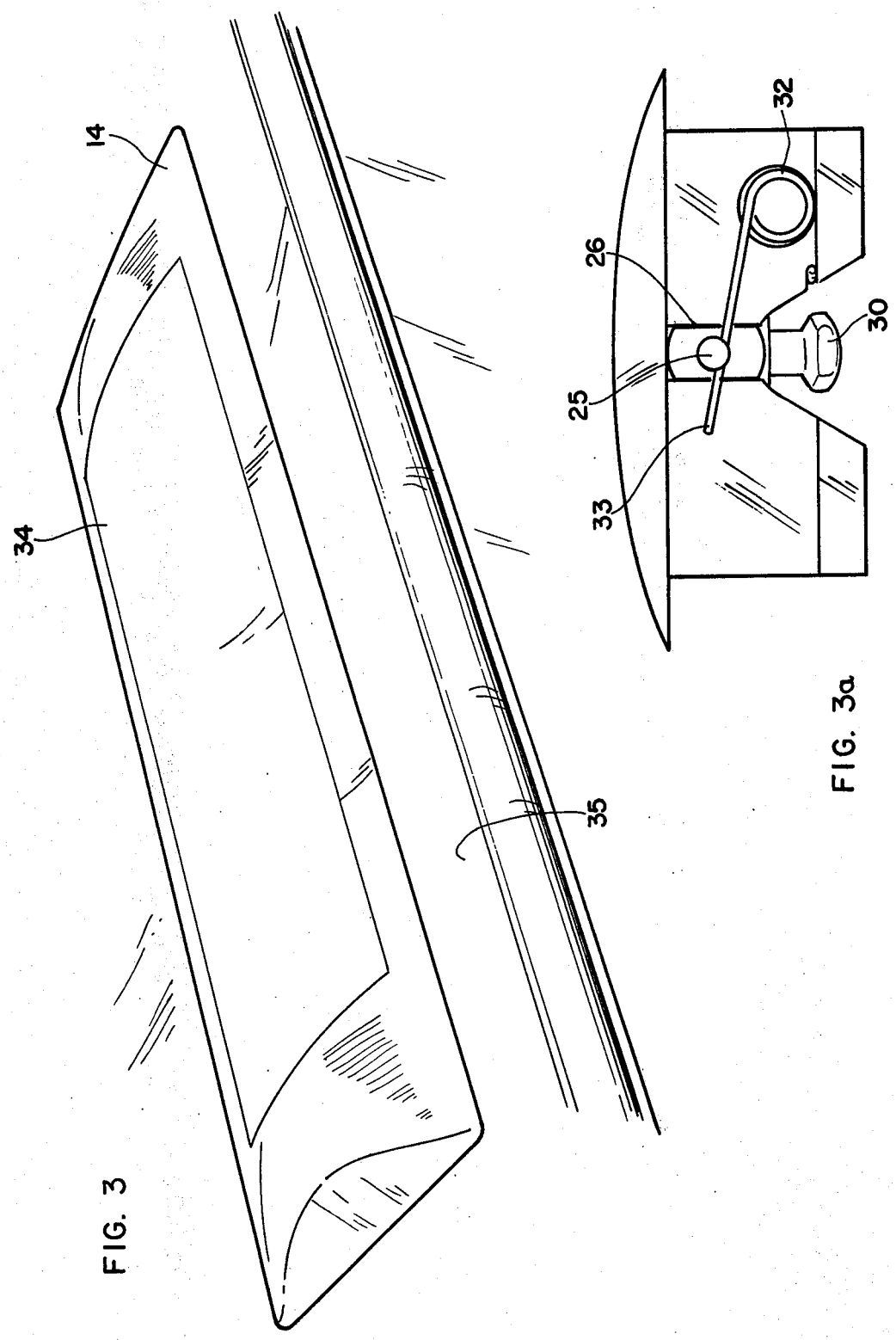
FIG. 3 is a view of the embodiment of FIG. 1 when installed in the deck of a boat, with the cleat in this instance having been rotated to the recessed position so as to leave the deck of the boat free and uncluttered.

FIG. 2 reveals that the shoulder member 36 running the length of the rotatable cleat member is symmetrically placed with respect to the body portion of the cleat member, such that the shoulder can normally remain in contact with the longitudinal inner edge 38 of the cleat frame, irrespective of whether the cleat 30 is uppermost, or the attractive planar portion 34 shown in FIG. 3 is uppermost.

It should be noted when rotation of the cleat member 20 has commenced to the extent shown in FIGS. 2 and 2a, a shaft dimension is presented which is larger than the respective slot 26, or in other words, once the cleat member has started to rotate as shown in these two figures, a wider shaft dimension is uppermost, such that upward movement of the cleat member 20, in view of the narrowness of each slot 26, is temporarily made impossible. However, continued counter-clock-wise rotation of member 20 in the instance at hand will cause the narrow dimension of shafts 24 to be presented to the slots 26 at such time as the full 180° rotation has been accomplished, with the result being that the planar portion 34 of the rotatable cleat member arrives at the deck surface. Note from FIG. 3 that the planar portion 34 can be an attractive adjunct to the upper surface of the deck of the boat shown in a fragmentary manner in this figure. The portion 34 may be flat but typically has rounded contours and a shiny finish.

Figure 4:
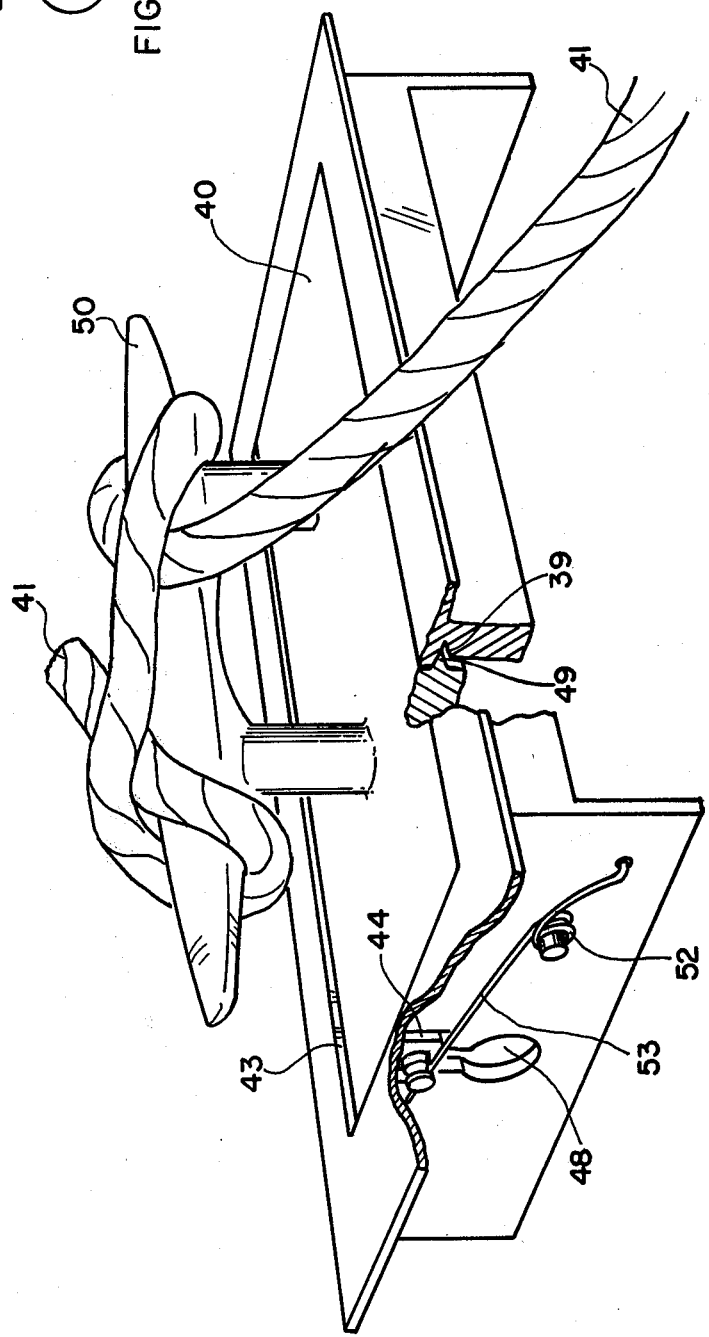
FIG. 4 is an embodiment of our device specifically designed to withstand great stress, with portions of this view being broken away to reveal how the slots at the end of the device have been configured to permit lateral movement of the cleat member in the presence of a pull, such that side edges can enter elongate notches.
Figure 4C:
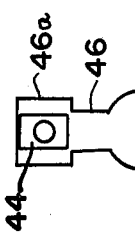
FIGS. 4a, 4b, and 4c reveal certain details associated with the embodiment of FIG. 4.
Figure 4B:
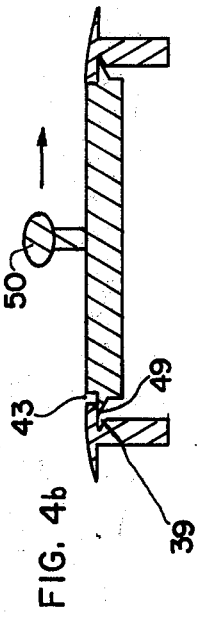
Figure 4A:
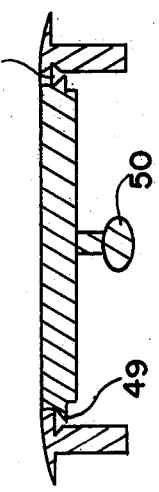

Turning to FIG. 4, we there illustrate an embodiment of our invention in which the rotatable cleat member 40 is designed to undertake a limited amount of lateral movement at such time as a substantial sidewise or upward pull, such as by a rope or line, has been sustained. As best seen in FIGS. 4, 4a and 4b, instead of a lip being presented along the long edge of the housing unit, a "V" shaped notch 39 is instead provided, into which the shoulder 49 utilized along each long edge of the member 40 can fit.

It will be noted in FIG. 4 that a rope or line 41 has been shown wrapped around the cleat 50, with the resulting pull thereon causing the rotatable cleat member 40 to move toward the near edge of the housing 42, thus leaving a gap 43 at the far edge of the housing. This action is clearly shown in FIG. 4b, and it is to be noted from FIG. 4c that the slots 46 are configured to have a wide upper portion 46a in order to permit the shafts 44 to undertake such lateral motion.

Although in most instances we have found that the arrangement depicted in FIGS. 1, 1a, 2 and 2a has ample strength in that the long edge of the housing reacts the lateral strain being put on the cleat 20, in the embodiment of FIG. 4, the interaction of the shoulder 49 with the notch 39 is such as to effectively resist cleat rotation even under the most severe circumstances.

It will be noted from FIG. 4a that the planar side of the rotatable cleat member has a slightly wider dimension, such that it fits snugly between the sides of the housing.

Figure 5:
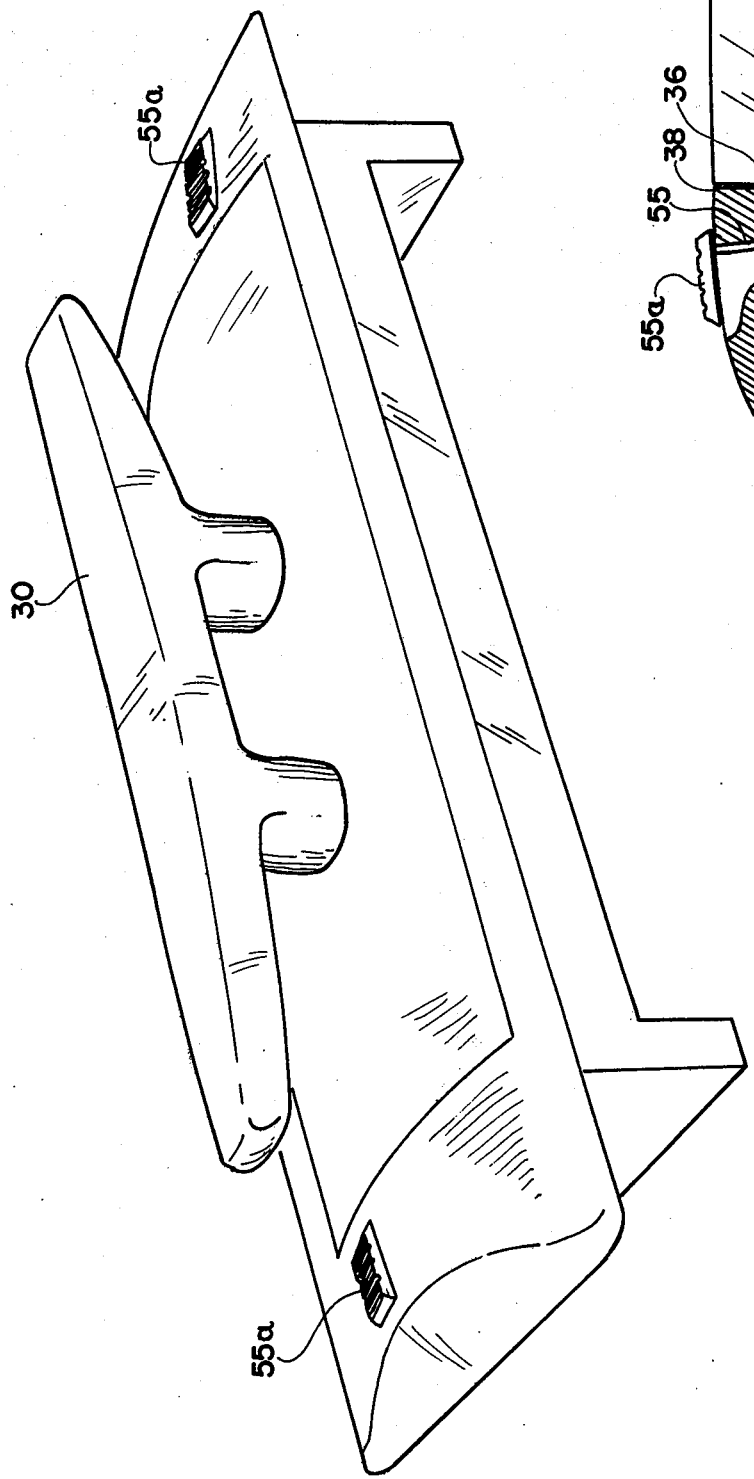
FIG. 5 is a perspective view of an embodiment of our invention having utilizing locking means to prevent unintentional rotation of the cleat member.
Figure 5A:
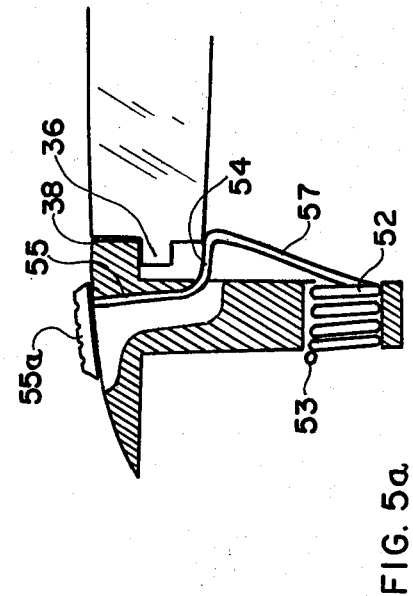
FIG. 5a is a cross sectional view to a somewhat larger scale, with portions removed in order to reveal the construction and operation of a typical locking spring.

Turning to FIGS. 5 and 5a, it will be noted from this figure closely resembling the embodiment of FIG. 1 that locking spring means 52 are provided on diagonally opposite corners of the housing in order to resist undesired downward cleat member movement except when it is desired to rotate the cleat to the recessed position.

In this embodiment, the free or active end 53 of each spring 52 is on the outboard side of the lower portion 16 of the housing in order to provide upward bias to the shafts of the cleat, with the portion of the spring on the inboard side of each member 16 being configured to provide a stop or shelf portion 54 of the type shown in FIG. 5a. As revealed in this latter figure, the stop or shelf portion 54 of the spring normally resides below the corner of the rotatable cleat member, such that the shoulder 36 is in firm contact with the lip or edge 38 extending around the interior portion of the central opening 22 of the cleat housing. An extra spring means may be used to assure the shelf 54 normally remaining in contact with the rotatable cleat member, but the configuration of spring 52 is usually such that the extra means is unnecessary.

A further continuation of the spring 52 results in the creation of a lever portion 55 of the spring, which extends slightly above the surface of the housing member, as will be noted from FIGS. 5 and 5a. We prefer to use a thumb-engaging member 55a on the portion 55.

The lever portion 55 is adapted to be moved away from the rotatable cleat member at such time as it is desired to rotate the cleat member, with such movement causing the shelf or stop portion 54 to move out of contact with the corner of the cleat member such that downward movement, and thereafter rotational movement, of the rotatable cleat member can be brought about.

We design the spring member 52 to normally reside in approximately the position shown in FIG. 5a, so that relocking of the cleat is automatically effected each time the rotatable cleat member has been caused to move upwardly in its slots by action of the free ends 53 of the pair of springs 52. The portion of the spring just below the stop or seat portion 54 of the spring is angled as at 57 such that the upward movement of the cleat member is not inhibited by the spring, and so that the spring can return to the locking position shown in FIG. 5a when the shoulder has reached the position in which it contacts the lip of the cleat housing.

Other locking means such as deadbolts, sliding panels, either spring-loaded or manually operated can accomplish the same general purpose, but are not described herein.

In FIGS. 6 and 6a we illustrate an embodiment quite similar to FIG. 1, but differing in the use of a single, elongate spring 62 held in place by a screw 67. The ends 63 of the spring 62 function in effect as torsion springs and by engaging a headed member on each shaft 64, serve to bias the rotatable cleat member upwardly. Shelf 65 adjacent each spring end 63 prevents the rotatable cleat member from moving too far downwardly during normal operation. Rotation of the cleat member cannot take place while the shafts 64 remain in their respective slots, but as before, rotation can take place when the member has been moved downwardly sufficiently far. Removal of the rotatable member from its housing or frame can be easily effected either by spreading the ends of the spring, or else entirely removing the spring.

Figure 8C:
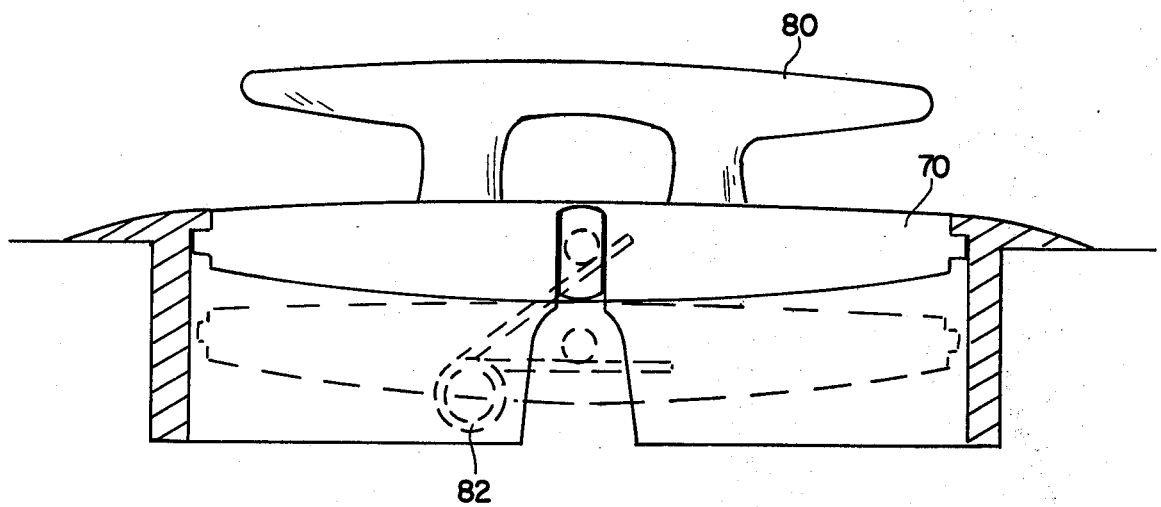
FIGS. 8c, 8d and 8e show our laterally operable device undertaking movement resulting in the conversion from an active cleat to a device in its recessed position.
Figure 8D:
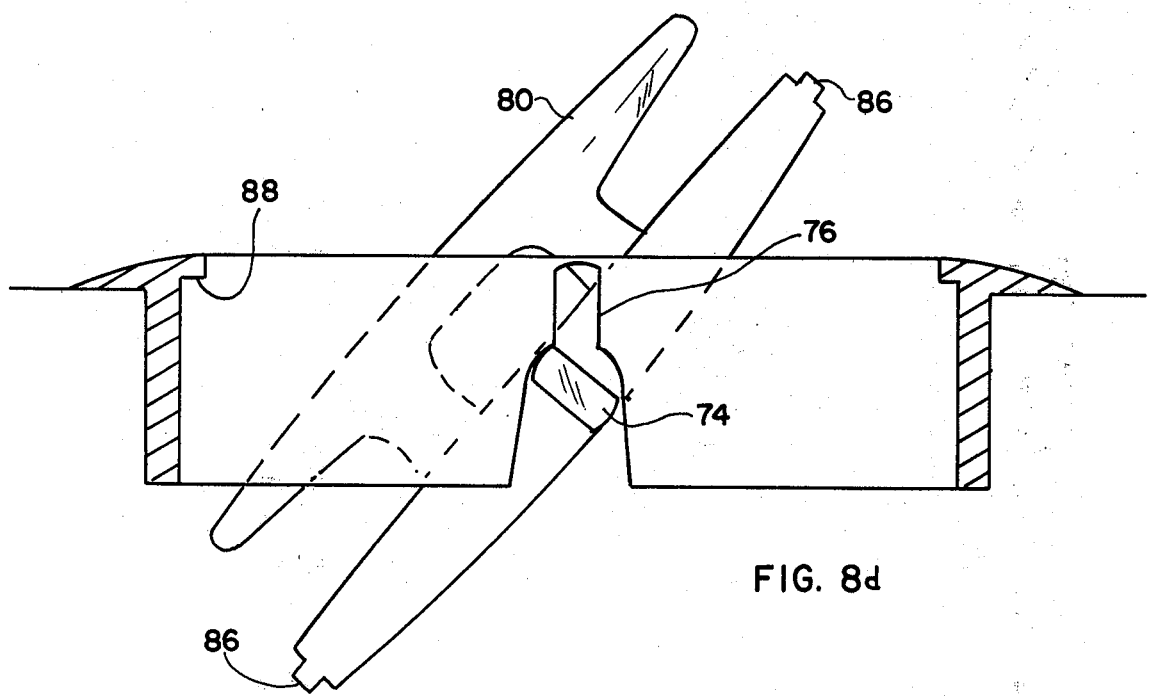
Figure 8E:
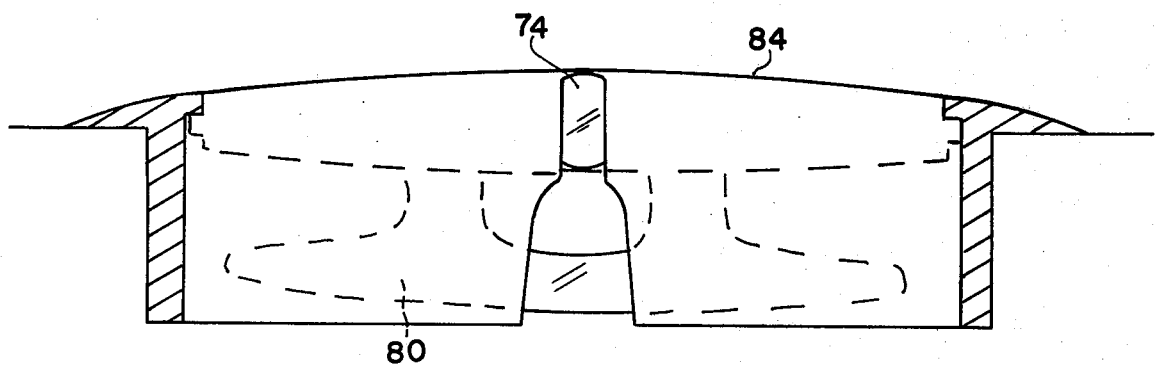

Turning to FIGS. 7, 8, and related figures, we have there shown an embodiment of our invention in which the cleat member 70 is rotatable about its lateral dimension, or in other words, about its short or medial axis. As before, the cleat is supported in its housing by at least one short shaft 74 that is oblong in configuration, so as to have flat, parallel, vertically disposed sides. These vertical sides fit closely in a slot 76 that effectively inhibits cleat rotation when the cleat is in the active position shown in FIGS. 7 and 8c, wherein the shoulder 86 at each narrow end of the cleat is in firm contact with each lip 88 of the cleat housing.

As shown in FIG. 8b, a form of torsion spring 82 is utilized to prevent the cleat from undesirably moving away from the active position shown in FIGS. 7 and 8a, this being as a result of the free end 83 of the spring being in contact with a portion of the rotatable cleat member 70.

As revealed in FIG. 8a, the rotatable cleat member 70 fits snugly in its housing or frame, and since its width dimension as revealed in this figure is small, only a single spring 82 is ordinarily required for biasing the member 70 upwardly. Although the supporting shaft on each side of the member 70 could be non-circular, and as before have flattened sides that fit into respective slots, we have found that the shaft on the spring side of the device can be a screw 87 against which the free end 83 of the spring acts.

The screw 87 is movable in a vertically disposed slot 85, with the vertical dimension of this slot determining the distance that the member 70 may move vertically during the procedure shown in related FIG. 8c through 84, in which the cleat member is moved from the active to the inactive position (or vice versa). Obviously, we construct the slot 85 to have a depth sufficient to permit the oblong shaft 74 to move clear of its slot 76 during the cleat rotational procedure. Removal of the rotatable cleat member 70 from its housing or frame can be accomplished after removal of the screw 87.

This embodiment has the advantages of a small number of components, and a narrow slot in which the member 70 is rotatable. Interaction of the shaft 74 with the slot 76, and the ridges 86 with the inner lips 88 of the frame effectively prevent undesired rotation of the cleat member. Furthermore, ruggedness of this design is enhanced by the member 70 being fitted closely between the relatively massive sidewalls of its housing, as revealed in FIG. 8a.

As should now be apparent, we have provided an attractive new cleat for effective usage by a wide variety of boats, that differs from the ordinary, fixed cleat by being able to be rotated when not in use to a below-deck location, thus to leave the deck lines clean and uncluttered. By the elimination of unncecessary projections from the decks and gunwales of his boat, the fisherman lessens the likelihood of his fishing lines becoming tangled, and the chance that the sportsman will trip during the enjoyment of his boat is considerably diminished.

Our device of course principally pertains to a fixture adapted to be embedded in the deck of a boat or other vessel and comprises a housing 12 defined by a plurality of walls. These walls form the support for a surface 14 to be placed in contact with the deck of the boat or other vessel, in which surface an aperture 22 of substantial size is located. A rotatable member such as 20, 40 or 70 is operatively associated with this aperture, and has on one side a planar surface, and on its other side has a marine fixture, such as a cleat, chock, handhold, or other item of hardware. This rotatable member is supported by a pair of parallel, oppositely disposed shafts.

One pair of the walls are parallel, spaced apart, and each contains a slot substantially perpendicular to the surface member 14, with the shafts being slidably disposed in the slots, and with the slots thus defining a path of travel for the rotatable member toward and away from the surface. Means define a lip 38 or 88 around at least a portion of the aperture, and bias means normally bias the rotatable member such that opposite edge portions thereof are normally in contact with such lip portions.

At least one of the shafts supporting the rotatable member is non-rotatable in the portion of its respective slit nearest the surface 14, but is rotatable in its slot after the rotatable member has been moved for a preascertained distance away from the surface, whereby the rotatable member can be selectively rotated such that either its planar side or its fixture side is deployed on the surface of the deck.

Although we can secure the fixture to the deck of the boat by means of screws extending through holes spaced around the edges of surface member 14, we may prefer to employ threaded studs attached to the bottom side of the surface 14, which are designed to pass through holes drilled for that purpose in the deck, with nuts thereafter placed on these threaded studs and appropriately tightened. Alternatively, threaded bosses can be utilized on the underside of the plate or surface 14, with machine screws being inserted upwardly through appropriately sized holes in the deck, and threaded into the bosses. A further alternative is to utilize screws passing through the walls 16 in order to engage the deck of the boat. As is obvious, the specific means utilized to secure the housing to the boat deck is not a part of this invention.

As to materials, a wide variety of non-corrosive materials may be used, both metallic and non-metallic. These include brass, bronze, aluminum-magnesium alloys, zinc die casting alloys, and even ferric materials that have been plated to resist corrosion.

Certain plastic materials that may be utilized include glass-phenolic or melamines. Our device lends itself to manufacture such as by casting, stamping, molding or forging and certain components can even be made from stock material. The cleat, chock, or other marine fixture may be secured to the rotatable member by screws, welding, brazing, or it may even be cast integrally with the rotatable member.

As is obvious, once the stationary fixture 12 has been secured to the deck, a given rotatable member may be removed therefrom by appropriate manipulation of the spring means, and a different rotatable member, such as one equipped with a different item of marine hardware may be quickly installed.

We claim:

1. A rotatable device for marine use, comprising a housing adapted to be embedded in the deck of the boat, said housing having an opening defined therein in which is mounted a rotatable member, said rotatable member comprising a plate substantially flat on one side, and having affixed on its other side an upstanding fixture, said member being rotatably supported by a pair of parallel, oppositely extending shafts, at least one of which shafts has flattened side edges that are closely received in an elongate, vertical slot in a wall of said housing, bias means normally biasing said member upwardly in its housing, said bias means being able to be overcome such that said member can be moved downwardly in its housing, this causing said oppositely extending shafts to be moved downwardly in their respective slots in said housing, said slots being enlarged at bottom locations to permit said member to be rotated 180° in either direction, such that either the fixture or the flat plate may be selected to reside in contact with the upper surface of the deck.

2. The rotatable device as defined in claim 1 in which said member is rotatable about its longitudinal axis.

3. The rotatable device as defined in claim 2 in which manually releasable locking means are provided for preventing undesired rotation or other motion.

4. The rotatable device as defined in claim 1 in which both of said supporting shafts are non-circular at least one location, having flattened, parallel side edges that are closely received in respective slots in said housing.

5. The rotatable device as defined in claim 1 in which said member is rotatable about its lateral axis.

6. The rotatable device as defined in claim 5 in which one of its supporting shafts takes the form of a removable screw, the removal of which facilitates disassembly of the device.

7. The rotatable device as defined in claim 1 in which said fixture is a cleat.

8. A rotatable cleat for marine use comprising a housing adapted to be embedded in the deck of the boat, said housing having an opening defined therein in which is rotatably mounted a cleat member, said cleat member comprising a plate substantially flat on one side, and having affixed on its other side an upstanding cleat, said cleat member being rotatably supported by a pair of parallel, oppositely extending shafts, at least one of which shafts has flattened side edges that are closely received in an elongate, vertical slot in a wall of said housing, bias means normally biasing said cleat member upwardly in its housing, said bias means being able to be overcome such that said cleat member can be moved downwardly in its housing, this causing said oppositely extending shafts to be moved downwardly in their respective slots in said housing, said slots being enlarged at bottom locations to permit said cleat member to be rotated 180° in either direction, such that either the cleat or the flat plate may be selected to reside in contact with the upper surface of the deck.

9. The rotatable cleat as defined in claim 8 in which said cleat member is rotatable about its longitudinal axis.

10. The rotatable cleat as defined in claim 9 in which manually releasable locking means are provided for preventing undesired cleat member movement.

11. The rotatable cleat as defined in claim 8 in which both of said supporting shafts are non-circular at least one location, having flattened, parallel side edges that are closely received in respective slots in said housing.

12. The rotatable cleat as defined in claim 8 in which said cleat member is rotatable about its lateral axis.

13. The rotatable cleat as defined in claim 12 in which one of its supporting shafts takes the form of a removable screw, the removal of which facilitates disassembly of the rotatable cleat.

14. A fixture adapted to be embedded in the deck of a boat or other vessel comprising a housing defined by a plurality of walls, said walls forming the support for a surface to be placed in contact with the deck of the boat or other vessel, in which surface an aperture of substantial size is located, a rotatable member operatively associated with said aperture, said rotatable member having a planar surface on one side and a marine fixture on the other side, said rotatable member being supported by a pair of parallel, oppositely disposed shafts, one pair of said walls being parallel, spaced apart, and each containing a slot substantially perpendicular to said surface, said shafts being slidably disposed in said slots, with said slots thus defining a path of travel for said rotatable member toward and away from said surface, means defining a lip around two opposite edge portions of said aperture, and bias means normally biasing said rotatable member such that opposite edge portions thereof are normally in contact with said lips, at least one of said shafts being non-rotatable in a portion of its respective slot nearest said surface, but being rotatable in its slot after said rotatable member has been moved for a preascertained distance away from said surface, whereby said rotatable member can be rotated such that either its planar surface or its fixture side is deployed on the surface of the deck.

15. The rotatable fixture as defined in claim 14 in which said member is rotatable about its longitudinal axis.

16. The rotatable fixture as defined in claim 15 in which manually releasable locking means are provided for preventing undesired movement.

17. The rotatable fixture as defined in claim 14 in which both of said supporting shafts are non-circular at least one location, having flattened, parallel side edges that are closely received in respective slots in said housing.

18. The rotatable fixture as defined in claim 14 in which said member is rotatable about its lateral axis.

19. The rotatable fixture as defined in claim 18 in which one of its supporting shafts takes the form of a removable screw, the removal of which facilitates disassembly.

* * * * *